(12) United States Patent
Drummond-Murray

(10) Patent No.: US 6,667,985 B1
(45) Date of Patent: Dec. 23, 2003

(54) COMMUNICATION SWITCH INCLUDING INPUT BANDWIDTH THROTTLING TO REDUCE OUTPUT CONGESTION

(75) Inventor: Justin A Drummond-Murray, Chorleywood (GB)

(73) Assignee: 3Com Technologies, Georgetown (KY)

( * ) Notice: Subject to any disclaimer, the term of this patent is extended or adjusted under 35 U.S.C. 154(b) by 0 days.

(21) Appl. No.: 09/386,481

(22) Filed: Aug. 31, 1999

Related U.S. Application Data

(63) Continuation-in-part of application No. 09/238,177, filed on Jan. 28, 1999, now abandoned.

(30) Foreign Application Priority Data

Oct. 28, 1998 (GB) .............................................. 9823489

(51) Int. Cl.[7] .............................................. H04L 12/28
(52) U.S. Cl. .................... 370/415; 370/230.1; 370/232; 370/235.1; 370/236; 370/282; 370/428
(58) Field of Search ................................. 370/229, 230, 370/230.1, 231, 235, 235.1, 236, 282, 401, 402, 412, 413, 414, 415, 416, 417, 418, 428, 429, 232, 233, 234

(56) References Cited

U.S. PATENT DOCUMENTS

| | | | | |
|---|---|---|---|---|
| 5,859,837 A | * | 1/1999 | Crayford | 370/230 |
| 5,983,278 A | * | 11/1999 | Chong et al. | 709/235 |
| 6,141,323 A | * | 10/2000 | Rusu et al. | 370/236 |
| 6,144,640 A | * | 11/2000 | Simpson et al. | 370/236 |
| 6,192,028 B1 | * | 2/2001 | Simmons et al. | 370/229 |

FOREIGN PATENT DOCUMENTS

| | | | | |
|---|---|---|---|---|
| GB | 2281005 A | 2/1995 | | H04L/12/56 |
| WO | WO 94/14266 | 6/1994 | | H04L/12/56 |
| WO | WO 95/15637 | 6/1995 | | H04L/12/56 |
| WO | WO 99/00949 | 1/1999 | | H04L/12/56 |

* cited by examiner

Primary Examiner—Dang Ton
Assistant Examiner—Shick Hoan
(74) Attorney, Agent, or Firm—Nixon & Vanderhye, PC

(57) ABSTRACT

A network switch maintains transmit queues and for each transmit queue a table which identifies the contributions of traffic received at the ingress ports to that queue. When a queue is too long, a pause frame is dispatched from a selected one of the ingress ports. The ingress port may be selected as that making the greatest contribution to the transmit queue. However, a control algorithm allows ports carrying high priority traffic to be excluded from the selection.

9 Claims, 4 Drawing Sheets

COMMUNICATION SWITCH INCLUDING INPUT BANDWIDTH THROTTLING TO REDUCE OUTPUT CONGESTION

CROSS-REFERENCE TO RELATED APPLICATION

This application is a continuation-in-part of U.S. patent application Ser. No. 09/238,177, filed Jan. 28, 1999, now abandoned.

INTRODUCTION TO THE INVENTION

This invention relates to switches for use in packet-based data communication systems.

BACKGROUND TO THE INVENTION

The invention is intended to be applicable to switches in a general sense for data packets. Although more specific terms, such as 'bridge' or 'router' or 'gateway' or other terms are used to denote particular devices, the invention is intended to be applicable in general to a device which can receive data at any of a multiplicity of ports and direct data packets from at least one selected port in accordance with address data, such as media access control data or network address data within the packets. The invention is not intended to be applicable to hubs wherein data received at any port is transmitted without any selection.

Although a distinction is made in the following between 'input' ports and 'output' or transmitting ports, it will be understood that the relevant qualifications refer to the function performed at the time by a given port and the invention is applicable to devices wherein ports may serve to both receive data from and transmit data to a respective network segment, or in other words the ports are bidirectional and whether a port receives or transmits depends on the control exerted by the processing and control functions within the switch.

In a switch employed in a packet-based or packet-switched communication system, incoming packets are processed to determine the port for which that packet is destined. The packets are, pending transmission from the respective 'output' port, temporarily stored, usually in a dynamic random access memory organised into buffers which are under the control of software 'pointers' which define for each 'output' port a queue of data packets waiting to be transmitted from that port. That is not the only manner of organisation of output queues; for example a plurality of FIFO stores may be used for basically the same purpose. In any event, the switch has means for storing data packets prior to transmission from the output ports and for identifying respective queues of data packets for the output ports.

When a packet is transmitted from any particular port, it is removed from the respective queue, so that there is an additional space for a new packet in the queue. In any practical device there is necessarily a limit to the amount of storage space which can be allotted to packets awaiting transmission from a device.

Frequently, the packets which are to be transmitted from a given port have been received by a multiplicity of ports on the device. Where, as is commonplace, the rate at which data packets are received on a port is of the same order as the rate at which data can be transmitted from a port, it is quite possible, when data to be transmitted from a port comes from a multiplicity of ports, for the transmit queue to become excessively long such that the allotted storage space is completely used and no more entries can be made. If this occurs, then a processor for determining which ports are to transmit received packets becomes jammed and is unable to forward packets to any of the other ports. This known phenomenon is termed 'head of line blocking'.

The present invention is primarily intended to reduce the incidence of 'head of line blocking'.

It is known, for example from WO94/14266, to determine, before forwarding across a switch a data packet from an input buffer to an output buffer, to determine whether the output buffer is 'full' and, if so, to prevent the forwarding of the packet across the switch. It is also known for example from WO99/00949, to allot different priorities to different input queues and to reduce the priority of a particular input queue if the contribution of that queue to a particular output queue is excessive. Both schemes may assist in avoiding congestion at an output buffer, though generally at the cost of requiring potentially large input buffer space. Moreover, though such proposals may temporarily relieve congestion, they are not adapted to avoid longer term congestion, which often arises because a particular source is sending traffic to a switch at an average rate which is greater than the switch can forward packets to the destination or multiplicity of destinations to which the packets must be sent.

SUMMARY OF THE INVENTION

One aspect of the invention concerns the reduction of the flow of data packets to a port which is identified as a principal contributor to an output queue. Input traffic cannot be stopped merely by preventing the forwarding of packets across the switch or the allocation of different priorities to input queues, as discussed in the aforementioned references.

It is known for Ethernet systems and particularly systems conforming to IEEE Standard 802.3 (1998 Edition) to employ MAC control frames. As described in Annexe 31B of that Standard, flow control frames may be used to inhibit transmission of data frames for a specified period of time. Such a frame includes a special multicast address, a 'pause' operation code and a request operand which indicates the length of time for which data frame transmission should be inhibited. A link partner, coupled to the switch which generates such a control frame, will on receipt of such a control frame cease sending data frames or packets to the switch for the period of time specified in the control frame. The present invention utilises such control frames or their equivalent, that is to say some frame having the nature of a packet and which will cause the recipient to cease temporarily the sending of packets.

In order to initiate the generation of a flow control frame, the present invention includes some means of relating the generation of control frames to the input traffic flow at a port.

This may be done by incrementing a counter with a value related to the size of incoming data packets, such as by counting octets therein, and decrementing the counter at some controllable rate. Such a counter is known as a 'leaky bucket' and is described for example in our GB patent application number 9807264.8 filed Apr. 3, 1998. By comparing the net content of the counter with a threshold, which may be adjustable, one can provide the mechanism of a remote throttle, which can be used to restrict, by means of the dispatch of 'flow control' frames, the traffic of packets being sent to a particular port. In what follows, a device which measures the input traffic to a port against a threshold to generate a signal which can be used to restrict traffic to that port is termed a throttle and the relevant process is termed throttling. It is emphasized that such a throttle is not preventing the flow of packets within a switch, it is signalling to a provider of packets to that switch.

It is customary for a switch to include some means for determining, by an examination of all incoming packets or at least regular samples thereof, the port-to-port traffic flow within a switch. As indicated hereinafter, this may be achieved by means of host matrix statistics which give the number of packets for each of the conversations, defined by destination and source MAC (media access control) addresses, and by means of a customary look-up table which relates media access control addresses with the 'input' and 'output' port for each packet. The port-to-port traffic flow data may alternatively be obtained using other statistics, such as RMON (remote monitoring) statistics.

The present invention is partly based on employing data, which is either available or can be readily made available, defining port-to-port traffic flow within the switch and to respond to a condition indicating that a transmit queue for a particular port exceeds a threshold to throttle traffic which comes by way of at least one of the ports to such a queue.

One feature of the invention is that by using several thresholds, or by making repeated determinations of the port by port contributions to an output queue, one or more input traffic flows can be progressively reduced.

Another aspect of the invention is the process by which traffic arriving at a receiving port is selected to throttling in accordance with the statistical data on the port-to-port traffic flow and an indication that a transmit queue exceeds a threshold or set limit. Control for the process may readily be obtained by setting a threshold either in software or hardware, depending on the nature of the transmit buffer. How the control is exerted is to some extent a matter of choice. For example, it may be desirable to ensure that the port which is selected for flow control in response to the detection of an over-long, transmit queue is the port which is identified as the greatest provider of traffic to the transmit queue. An examination of the port-to-port traffic statistics enables an identification of the most prolific input port in relation to the output queue and the data traffic received at that port can be reduced, preferably progressively. The criteria for controlling the traffic flows to the ports may be such that if the port which has been identified as the most prolific has had its traffic reduced, yet the transmit queue is still excessive, then a second most prolific provider of traffic may have its bandwidth reduced and so on, the process being carried on until an equilibrium is reached where the transmit queue for the output port does not grow.

The main advantage of the present invention is that the reduction of traffic to an input port or ports may be made to occur well before a transmit queue is completely full. This assists in avoiding the blocking of a switch and normally will enable ports that are not communicating to the potentially congested output port to continue their respective port-to-port traffic unaffected.

The invention may be extended throughout a network. If for example an input port is connected to an end node, then the device at that node can be forced to send less traffic. If the input port of a first switch is connected to another switch, then the relevant transmit queue of that other switch will increase to the point where a similar mechanism to that described in relation to the first switch can be used to reduce the traffic arriving at a port or ports in the other switch. The invention contemplates thereby a dynamic bandwidth control which enables a whole network to balance itself to traffic flow rates without any direct management from a network administrator.

A possible feature of the invention comprises excluding a specified port or ports from the process of determining which port or ports should be subject to traffic reduction in response to the detection of an excessive transmit queue. This feature enables a specified port or ports to be excluded from any traffic reduction and may be used to allow specific ports to function as nodes that must unconditionally be guaranteed as much traffic as they require The feature enables important or high priority traffic to continue unimpeded while less important or low priority traffic is restricted. For example, the control process can examine types of packets so that ports which contain large amounts of 'web-browsing' packets may be penalised more than a port carrying mostly network management traffic.

DETAILED DESCRIPTION OF A PREFERRED EMBODIMENT

Figure 1:
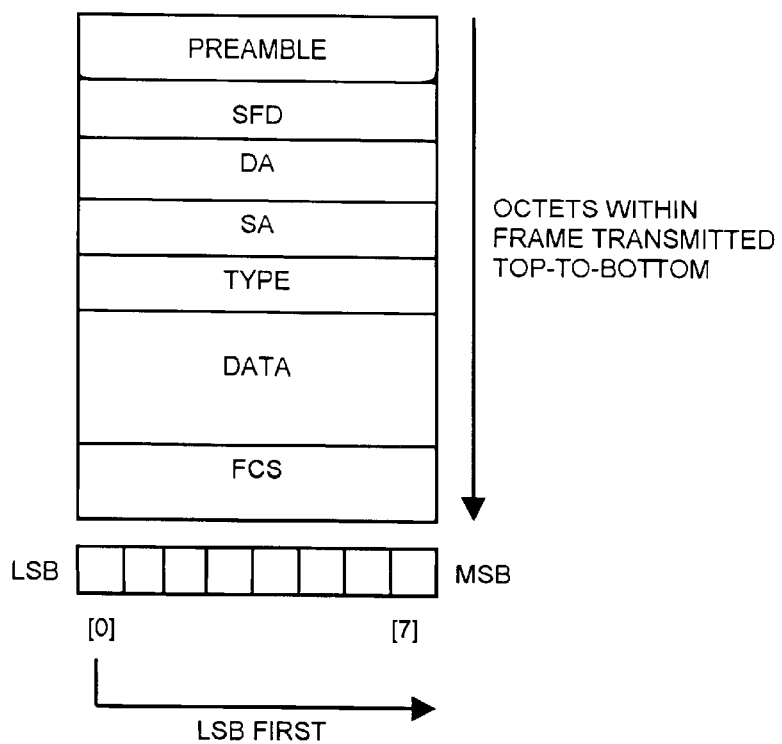
FIG. 1 is a schematic representation of an ordinary known form of data packet employed in a system including a switch according to the invention.

FIG. 1 illustrates a known form of data packet suitable for use in 'Ethernet' networks. Though such packets are encapsulated and de-encapsulated from time to time and therefore do not necessarily have all the sections illustrated throughout their lifetime, the principal parts of such a data packet are a preamble, a starter frame delimiter (SFD), a destination address (DA), a source address (SA), control and type data (TYPE), message data (DATA) and a frame check sum (FCS) constituted typically by cyclic redundancy code. The packet is normally transmitted such that each octet is transmitted least significant bit (LSB) first, and the octets of the frame being transmitted from 'top' to 'bottom' as shown in the Figure. Of relevance to the present invention is the state of such a packet when the destination address and source address are 'layer 2' or 'MAC' addresses, denoting the device from which the packet has come to the switch and the device to which it should be transmitted.

Figure 2:
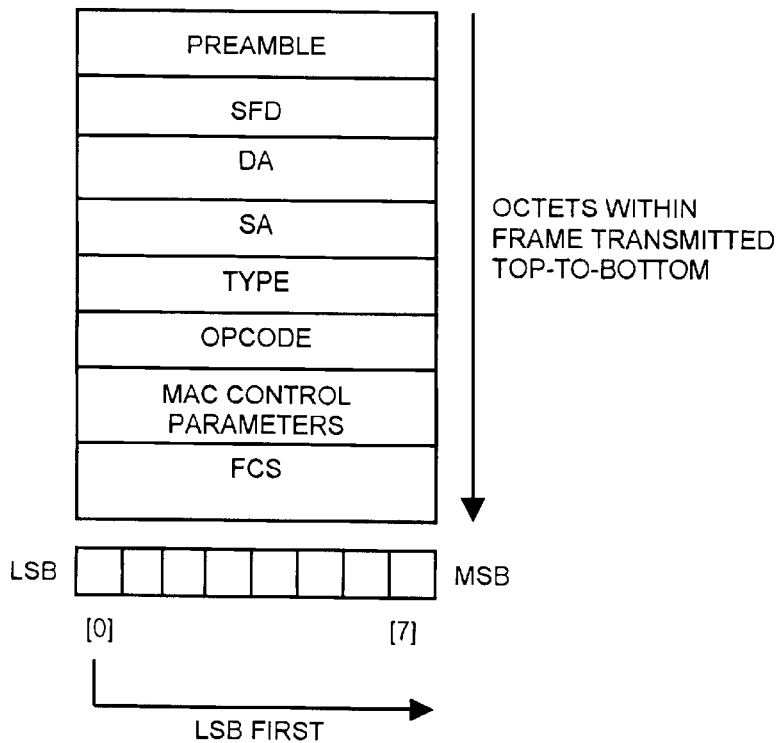
FIG. 2 is a schematic representation of an MAC control frame.

FIG. 2 illustrates schematically a MAC control frame, such as defined for example in IEEE to Standard 802.3, 1998 Edition. MAC control frames are fixed length frames. They can be generated by a MAC, which will normally be prepend the preamble and start of frame delimiter fields and append the frame check sum (FCS). In general, MAC control frames include a destination address, a source address, and a type field, which by convention (and in accordance with the aforementioned Standard) is a two octet field which contains a specific hexadecimal value universally assigned for MAC control of CSMA/CD local area networks. The MAC control frame includes an operation code (OPCODE) and a variety of other parameters. The type of control frame which is of interest to the present invention is a flow control frame which (as explained in Annexe 31 of the aforementioned Standard) includes a PAUSE field and a relevant operation code which together, when received by the device for which the control frame is intended, cause that device to cease sending packets to the recipient (the source of the control frame) for an interval which is specified in the 'PAUSE' field.

The aforedescribed data packet and flow control frame have been reviewed because a switch according to the invention will rely on a data table compiled by reading the destination and source addresses of packets within the switch and will, in a manner to be described, selectively control the traffic arriving at a selected port or selected ports of the switch by means of 'flow control' frames such as that described with reference to FIG. 2. Of course, as those skilled in the art will appreciate, the reading of destination and source addresses from packets is customarily employed for a variety of purposes and flow control frames are employed in a variety of circumstances to inhibit or delay the sending of packets to a switch or other device.

Figure 3:
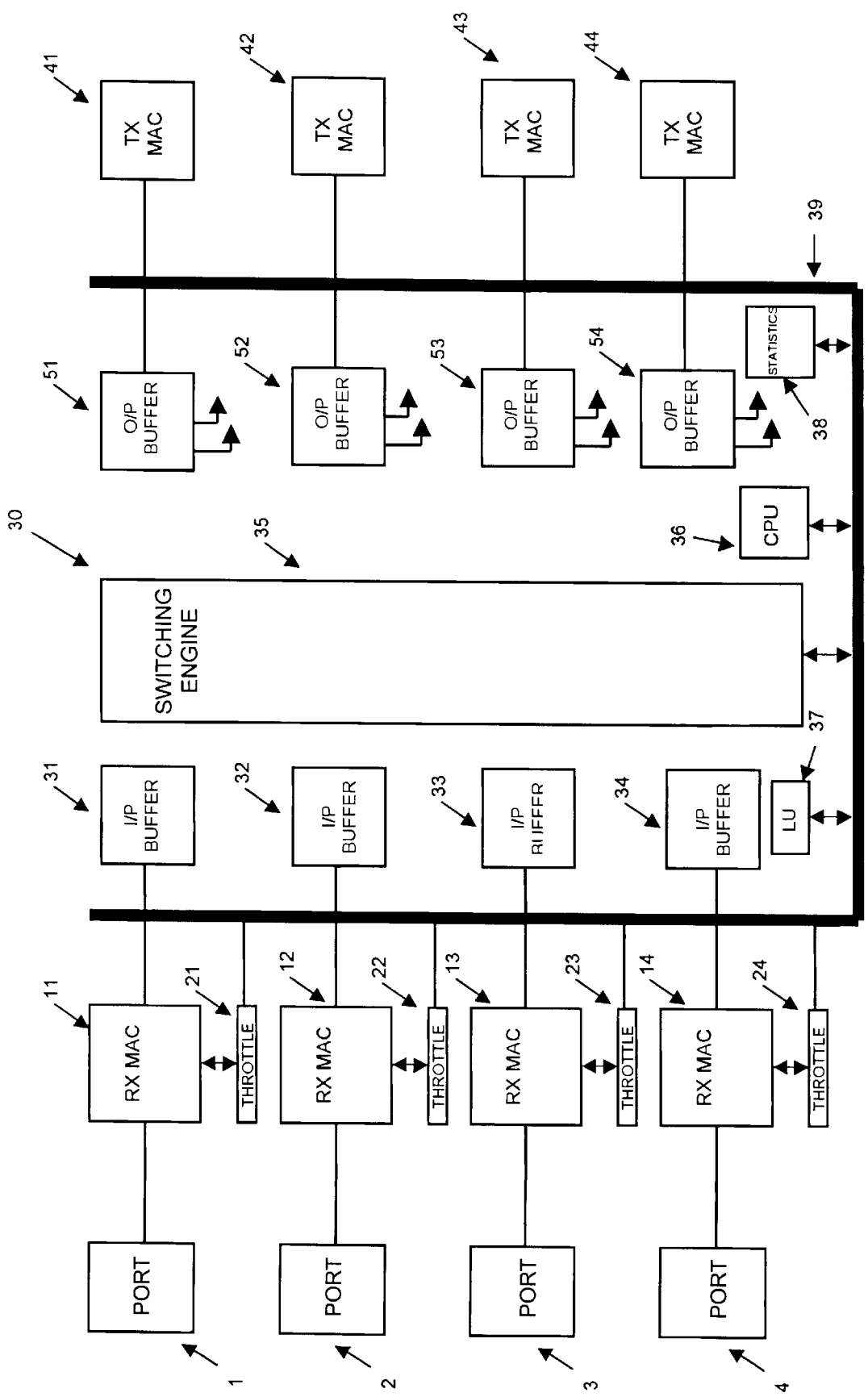
FIG. 3 is a schematic representation of a switch according to the invention.

FIG. 3 illustrates in schematic terms only a switch organised according to the present invention. It is emphasised that for the sake of simplicity the switch is not illustrated in terms of its various layers according, for example, to the customary OSI model but is illustrated in conceptual terms for the sake of easy explanation. Furthermore, certain essential but commonplace features of a switch, such a decoding, the reading of addresses on packets, the detailed establishment of statistics, and so on have been omitted for the sake of simplicity.

The switch 30 shown in FIG. 3 is illustrated has having four physical ports 1, 2, 3 and 4. Each of these ports is associated with a respective receiver (RX MAC) 11, 12, 13 and 14. Customarily, ports on a switch are bidirectional, being capable of both transmission and reception, on separate pairs of lines if the connection is by way of twisted pairs, and accordingly each of the ports will have a transmitter constituted in this example by a respective one of the TX MACs 41, 42, 43 and 44. These have been shown separated from the ports to avoid congestion of the Figure.

As will be described in more detail later, each of the RX MACs 11–14 has a respective 'throttle' 21 to 24 respectively. As will be described with reference to FIG. 5, these throttles are operated under the control of the statistics of traffic flow through the switch and are arranged to restrict the traffic through the respective port by means of the transmission of flow control frames to the device which sends packets to the respective port.

Each of the RX MACs is associated with a respective input buffer 31 to 34 respectively. These buffers are typically FIFO buffers which may be defined in a respective dedicated section of memory space within a single physical memory device. However they are implemented, each of the input buffers stores in a 'receive queue' those packets which have been received by the respective port, pending the forwarding of the packets across the 310 switch to one or more of a multiplicity of transmit queues each of which is held in a respective output buffer (51 to 54) of which there is one for each of the TX MACs 41 to 44. A switch of this general kind customarily has a switching engine 35, a processor (CPU) 36, a look-up table 37, and a statistics function 38. In the schematic illustration of the switch in FIG. 3A the switch is shown with a bus system 39 by means of which data (i e. data packets), status signals and control signals are conveyed from the various functions of the switch to their destinations. It is again emphasised that with the exception of the throttles 21 to 24, switch 30 shown in FIG. 3 is organised in accordance with the state of the art.

In a switch such as shown in FIG. 3, a packet arriving at any given port and held within the respective receive queue is subject to a look-up process. A look-up table is customarily established by storing entries related to source addresses of packets received by the switch so as to establish the port number of the port connected to the device having that source address. The destination address is examined for correspondence with an entry in the table in order to establish the port number (or port numbers) of the port (or ports) from which the packets should be forwarded. Where appropriate entries do not exist in the look-up table, it is normally necessary to 'broadcast' the packet to a multiplicity of destinations in order to resolve the address data and to create an appropriate entry in the table.

At any time therefore each of the input buffers holds a queue of packets, each of which will be forwarded to at least one transmit queue in an output buffer by means of the switching engine 35. Packets are forwarded from the transmit queues in the output buffers by way of the respective TX MAC and the port connected thereto.

Switches of this general nature commonly possess some thresholding or watermark device in (implemented in hardware, software or both) which are intended to prevent the forwarding of a packet to an output buffer which has achieved a specified degree of fullness. The specified degree of fullness could theoretically correspond to a complete filling of the output buffer space, but for a variety of well established reasons (such as the finite time it takes to take action) it customary to define a fullness threshold which corresponds to some predetermined fraction of the physical capacity of the output buffer. The fraction may generally be in the range from 30 to 50% of the physical capacity of the buffer. When such a threshold is exceeded the switching engine is signalled so that it prevents the forwarding of packets from any of the receive queues to the respective output buffer.

The output buffers of the switch 30 have at least one threshold defined, each associated with a selected length or proportion of fullness of the transmit queue. There may (but need not be) more than one threshold defined for each queue. The exceeding of a threshold is shown by the downward arrows illustrated for the buffers 51–54 and at 71 in FIG. 4. It is customary in packet switches to compile a variety of statistics. One known form of those statistics is a 'host matrix' table which is illustrated at 45 in FIG. 4. The table has a respective entry for each destination address/source address pair in the packets received by the switch and is, in accordance with known practice, compiled by a reading of the destination address (DA) and source address (SA) of each packet as it is transferred from the respective RX MAC to the respective receive queue. Each entry in the table includes a number which represents an accumulation of the traffic identified by the respective DA/SA combination. The number is conveniently the number of octets, so that the respective accumulation (N1, N2 and so on for each DA/SA pair) is augmented by the number of octets in each packet having the respective DA/SA combination. The statistics may be reset as desired.

As indicated hitherto, the look-up process performed on packets establishes, among other things, the port number associated with any given source address and destination address. This information is commonly obtained from an associated data table (shown at 46) forming part of the look-up table or forwarding database as it is often known. It is therefore readily possible to establish a port matrix, shown at 47, wherein the traffic associated with each pair of ports is accumulated in octets.

Figure 4:
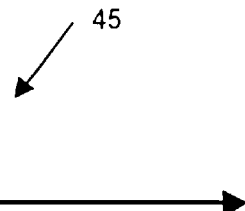
FIG. 4 is a schematic representation of the development of control parameters according to the invention.
Figure 4:
Figure 4:
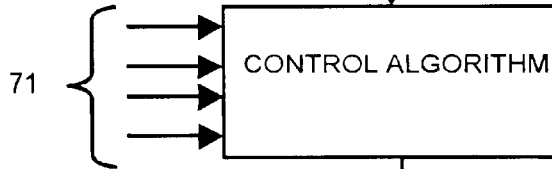
Figure 4:
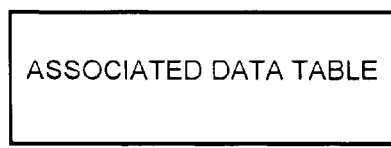
Figure 4:
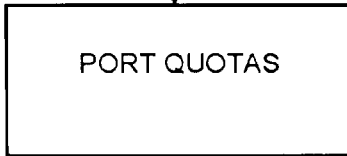

As is shown by way of example in FIG. 4, the entries 0, 1, 2 etc in the table are each related to a respective port to port traffic flow and the volume of it. For each entry in the host matrix table the source and destination ports for that conversation are determined by carrying out a look-up on the SA and DA respectively. The entry in the port matrix table which corresponds to that port-to-port traffic is incremented by the number of octets in the host matrix entry. The next entry in the host matrix table is checked and so on. Multiple entries in the host matrix table can reference the same location in the port matrix table and each time the existing value is incremented.

In the illustrated example, there is no traffic which both arrives and leaves port 1. The traffic arriving at port 1 and destined for port 2 is recorded as P1 octets, the traffic arriving at port 1 and destined for port 3 is recorded as P2 octets and so on.

In respect of any particular 'transmit' port (e.g. port 3) it is straight forwarded to compute which 'receive' port has caused the most traffic to be placed on the respective transmit queue. In the fragmentary example shown, port 1 and port 2 have contributed P2 and P5 octets to the transmit queue for port 3 and the larger of P2 and P5 will indicate which of ports 1 and 2 is more likely to be causing congestion. It may be desirable to identify this port in a separate register so that every time the onset of congestion is indicated for port 3 the most active relevant port can be identified without additional computation.

The data in the port matrix table can now be used as the controlling data for an algorithm which will exert selective flow control and thereby reduce the incidence of head of line blocking.

Broadly, the scheme is to determine, as shown by the 'control algorithm' 48, which may be implemented within the CPU, which may be the port or ports which contribute the most to the traffic through the switch, and which are therefore most likely to cause congestion within the switch, and to develop control parameters or quotas, shown at 49, which control the various flow control throttles.

In a simple scheme, the port that contributes most to the traffic through the switch may be subjected to 'flow control' as it has been described. Thereby the device which is connected to that port is forced to send less traffic. This can have an effect throughout a network since if the device connected to the port which throttled is forced to send less traffic, then the relevant transmit queue in that other device will increase to the point where a similar mechanism to that described in relation to the present switch can be used to reduce the traffic to a port or ports in the other device. In this way one can provide a dynamic bandwidth control which enables a whole network to balance itself to traffic flow rates without any direct management from a network administrator.

The control algorithm is initiated when a threshold in any of the transmit queues is exceeded. As explained with reference to FIG. 5, this causes the sending of a flow control frame from at least one port. It will be understood that if the transmit queue remains above the threshold a repeated application of the control algorithm will again produce a flow control frame. Thus the traffic can be progressively reduced until the likelihood of head of line blocking is substantially reduced.

Figure 5:
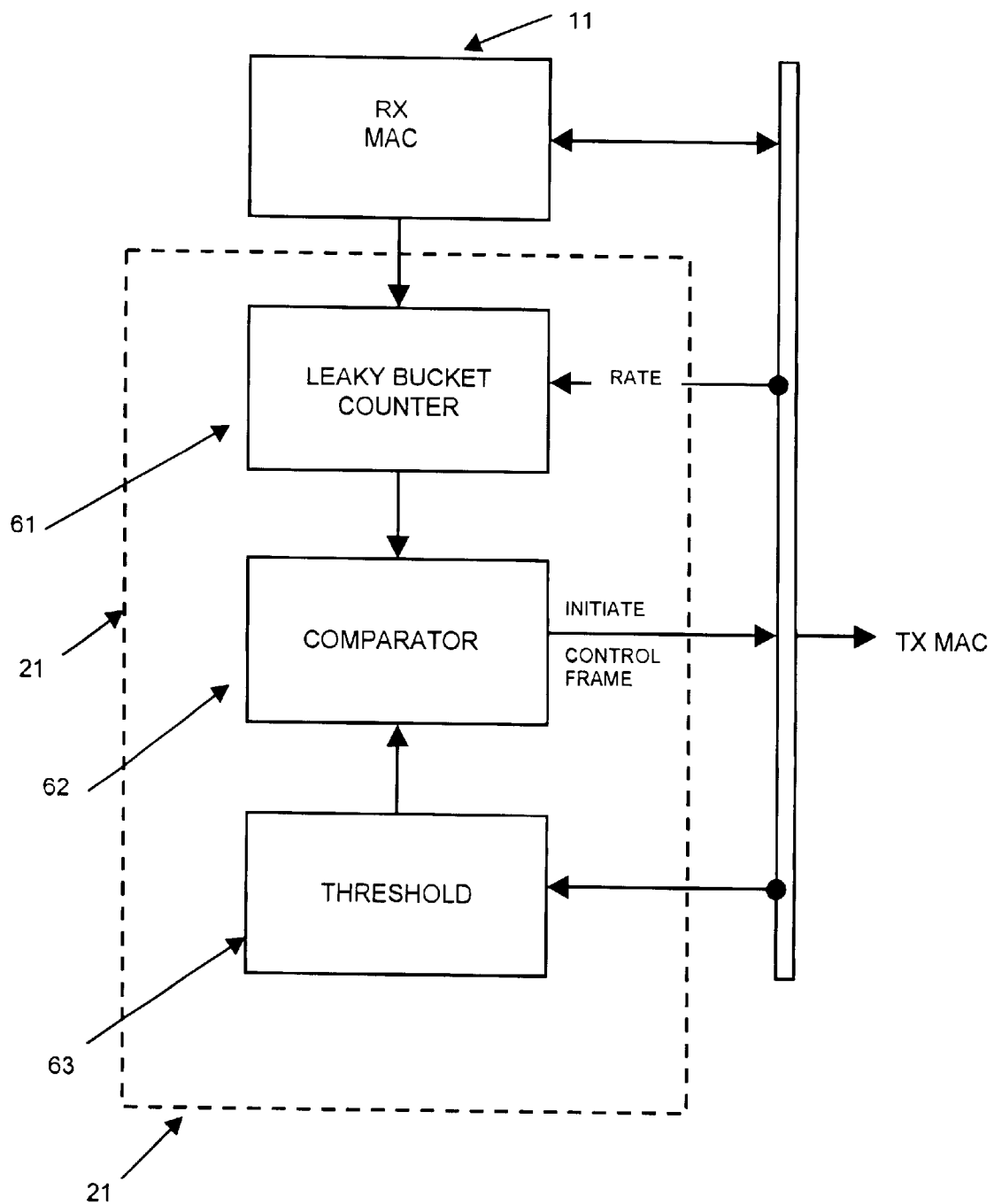
FIG. 5 is a schematic illustration of a throttling feature forming part of the switch shown in FIG. 3.

In a more sophisticated scheme, which still retains the essential quality of the simple scheme just described, the ports which contribute most to the traffic through the switch may be controlled with varying degrees of control to reduce the traffic to those ports. Furthermore, the control which is exerted may be incremental or progressive and therefore represents a significant improvement over those schemes which merely provide a on/off control of traffic from, for example, an input queue to an output queue. How this is achieved is conveniently described with reference to FIG. 5, FIG. 5 illustrates in more detail a specific one of the RX MACs 11 and its associated 'throttle' 21. This so called throttle comprises a counter 61 which is incremented, for example by the relevant number of octets, as each packet is received by the RX MAC. The counter is decremented at a selected rate. Such a counter is known as a 'leaky bucket' counter. The accumulated contents of the counter are compared, by means of a comparator 62, with a selected threshold, shown at 63. Both the threshold 63 and the decrementing rate of the counter may be selected by the CPU as part of the aforementioned control algorithm.

The exceeding of the threshold is employed to initiate the generation of a flow control frame to the respective port (by way of the bus 39 and the respective TX MAC). This provides the means of relieving long term congestion and allowing the network to adapt itself to traffic flow without the intervention of a network administrator. The flow control frame is generated either by the TX MAC or otherwise in such manner that it is dispatched before the respective TX queues so that the flow control is not delayed by ordinary packets.

In the scheme according to the invention, if a selected port, as determined by the port matrix statistics, is to have its traffic reduced, the CPU can decrease the decrementing rate in the respective throttle so that the threshold 63 which is associated with the generation of a flow control frame is reached more quickly. There is a degree of sophistication here which is not possessed by earlier systems, since the reduction in the decrementing rate can be made progressive or proportional to the contribution of traffic to the relevant port to the total input traffic. Moreover each traffic queue can be associated with a multiplicity of watermarks each identifying a respective level of fullness of the respective output buffer. When a second watermark is passed, the control process can identify which of the ports or which of a number of ports are providing the most traffic and decrementing rate for the relevant leaky bucket counters can be reduced by more than when the first threshold is passed. Alternatively the threshold 63 of a throttle can be reduced.

It should be remarked that the present invention does not in itself absolutely prevent head of line blocking, since that is a function not only of the progressive back pressure which is exerted on the devices sending traffic to the switch in question, but the main purpose is to monitor transmit queues so as to have adequate warning of excess traffic, to identify from the statistics which ports are providing the most traffic to the switch and to exert flow control on the devices connected to the port or ports that provide the most traffic. It is a particular advantage of the invention that this flow control can be exerted in a progressive manner which is also adaptable to special conditions For example, a particular port might be excluded from this scheme of flow control because that port must be unconditionally allowed as much 'bandwidth' as possible. Other modifications of the scheme within the invention may readily be devised and are intended to be within the scope of the claims that follow.

What is claimed is:

1. A switch for a data communication system, the switch comprising:

a multiplicity of receive ports operative to receive addressed data packets;

a multiplicity of transmit ports operative to transmit addressed data packets;

means for storing said addressed data packets prior to transmission from the ports that are operative to transmit data packets, said means for storing establishing a transmit queue of addressed data packets for each of said transmit ports;

means responsive to some of said addressed data packets for establishing for each said transmit queue measures of the contribution to that transmit queue from each of said multiplicity of receive ports;

means responsive to said measures and to an indication that a transmit queue of data packets for one of said transmit ports is excessively long and to identify at least one of said receive ports that provides data packets to said excessively long transmit queue; and means operative to dispatch from the identified receive port a control frame which prescribes a temporary cessation of the sending of data packets to the identified receive port.

2. The switch according to claim 1, wherein said means for establishing the measures comprises a host matrix table.

3. The switch according to claim 1, wherein said means operative to dispatch a control frame comprises a counter incremented in accordance with addressed data packets received by the identified receive port, means for comparing the content of the counter with a threshold to initiate said control frame and means for adjusting a decrementing rate of the counter.

4. The switch according to claim 1, wherein the means responsive to said measures comprises a processor operable in accordance with a control algorithm which identifies the identified receive port.

5. The switch according to claim 1, wherein address data of said addressed data packets comprises MAC source and destination addresses.

6. A switch for a data communication system, the switch comprising:

a multiplicity of ports operative to receive and transmit addressed data packets;

means for establishing, for at least one port of said multiplicity of ports, a transmit queue of addressed data packets for transmission from said one port;

means for providing an indication when said transmit queue is excessively long;

means for monitoring addressed data packets received at said ports to establish, for said transmit queue, the ports which make contributions of addressed data packets to said transmit queue and measures of said contributions;

means responsive to said measures and to said indication, to select a particular port that contributes addressed data packets to said transmit queue; and means operative to dispatch from said particular port a control frame comprising an operating code that prescribes a temporary cessation of the sending of data packets to said particular port.

7. A switch for a data communication system, the switch comprising:

a multiplicity of ports operative to receive and transmit addressed data packets;

means for establishing, for at least one port of said multiplicity of ports, a transmit queue of addressed data packets for transmission from said one port;

means for providing an indication when said transmit queue is excessively long;

means for monitoring addressed data packets received at said ports for establishing, for said transmit queue, a matrix table which identifies the ports that make contributions of data packets to said transmit queue and measures of said contributions;

means responsive to said matrix table and to said indication to select a particular port that contributes addressed data packets to said transmit queue; and means operative to dispatch from said particular port a control frame comprising an operating code that prescribes a temporary cessation of the sending of data packets to said particular port.

8. A switch for a data communication system, the switch comprising:

a multiplicity of ports operative to receive and transmit addressed data packets;

means for establishing, for at least one port of said multiplicity of ports, a transmit queue of addressed data packets for transmission from said one port;

means for providing an indication when said transmit queue is excessively long;

means for monitoring addressed data packets received at said ports to establish, for said transmit queue, a matrix table which identifies the ports that make contributions of addressed data packets to said transmit queue and measures of said contributions;

a processor responsive to said matrix table and to said indication and operable in accordance with a control algorithm to make a selection of a particular port that contributes addressed data packets to said transmit queue; and means operative to dispatch from said particular port a control frame comprising an operating code that prescribes a temporary cessation of the sending of addressed data packets to said particular port.

9. The switch according to claim 8, wherein said control algorithm excludes at least one of said ports from said selection.

* * * * *